United States Patent [19]
Hadden

[11] 3,717,858
[45] Feb. 20, 1973

[54] TWO CONDUCTOR TELEMETERING SYSTEM

[76] Inventor: David M. Hadden, 750 Saratoga Ave., San Jose, Calif. 95122

[22] Filed: Aug. 12, 1970

[21] Appl. No.: 63,155

[52] U.S. Cl. ..................340/203, 340/206, 340/210, 321/2, 323/18, 323/22 T
[51] Int. Cl. ..............................................G08c 19/16
[58] Field of Search..............340/203, 206, 237, 210; 323/22 T, DIG. 1; 321/2, 45 S

[56] References Cited

UNITED STATES PATENTS

| | | | |
|---|---|---|---|
| 3,455,162 | 7/1969 | Michener et al. | 340/210 |
| 3,497,794 | 2/1970 | Frederickson et al. | 323/DIG.1 |
| 3,527,999 | 9/1970 | Weinberger | 323/DIG. 1 |
| 3,525,089 | 8/1970 | Bruce | 340/206 |
| 3,517,556 | 6/1970 | Barker | 340/210 |
| 3,560,948 | 2/1971 | Inose et al. | 340/186 |
| 3,378,758 | 4/1968 | Goodenow | 323/22 T |
| 3,399,398 | 8/1968 | Becker et al. | 340/237 |

OTHER PUBLICATIONS

Fairchild Application Note, MA723, Precision Voltage Regulator, 20–BR–0064–78/1968, page 4.1

*Primary Examiner*—John W. Caldwell
*Assistant Examiner*—Robert J. Mooney
*Attorney*—Harry E. Aine and William J. Nolan

[57] ABSTRACT

In a two conductor telemetering system, a sensor and transmitter are disposed at an outlying station. The transmitter produces a train of pulses having a repetition rate which is a function of the quantity being measured by the sensor. The pulses are transmitted over a two conductor transmission line to a base station counter to the flow of power from the base station to energize the sensor and transmitter. A switching voltage regulator is provided at the outlying station for converting the supplied dc power of a relatively high unregulated voltage and low current to a regulated relatively low voltage at high current for energizing the sensor and transmitter.

6 Claims, 5 Drawing Figures

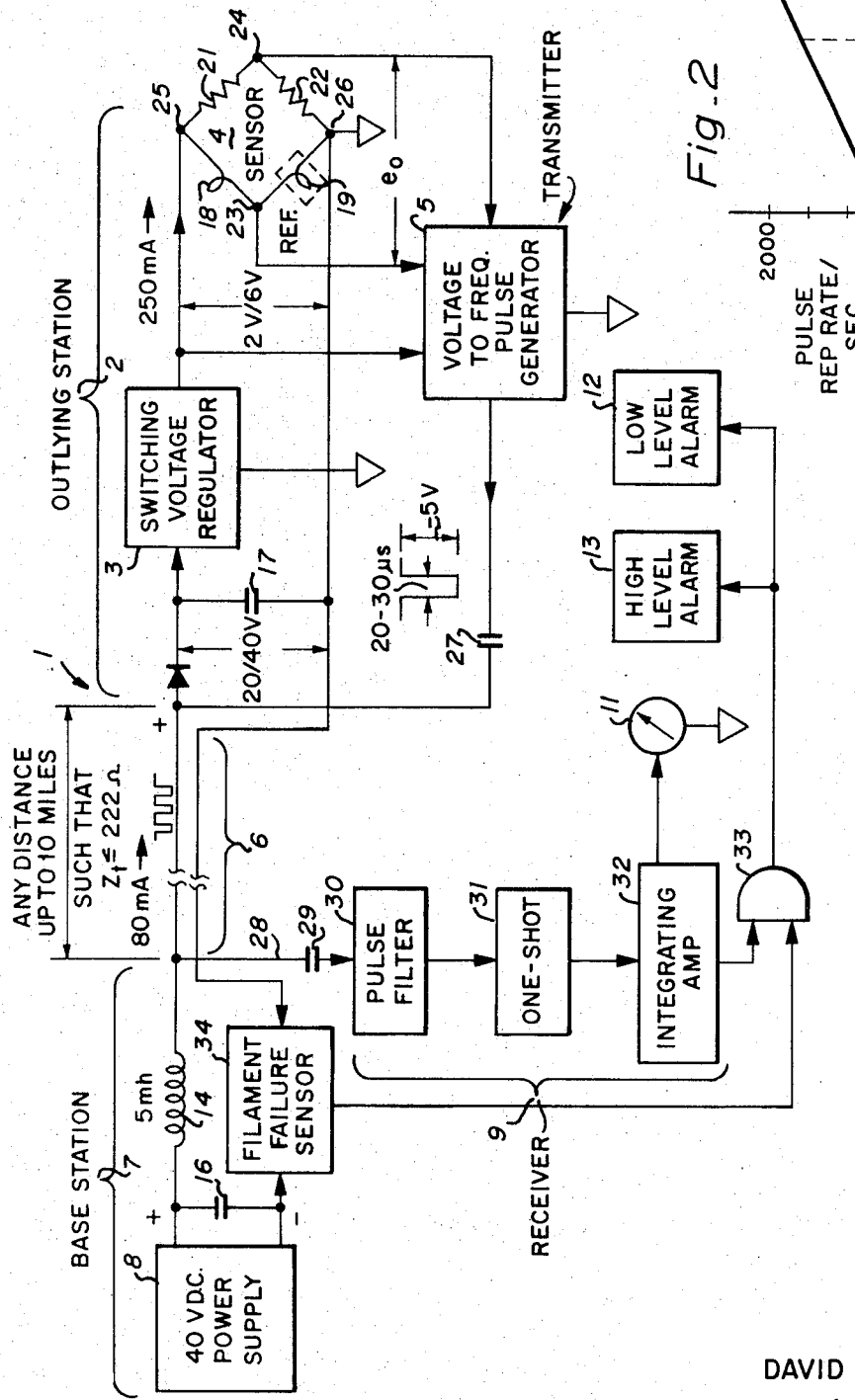

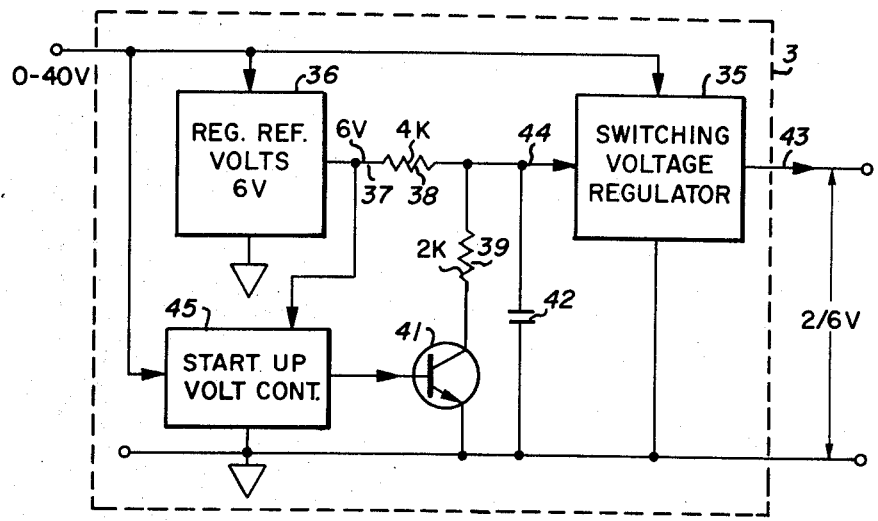
Fig_3
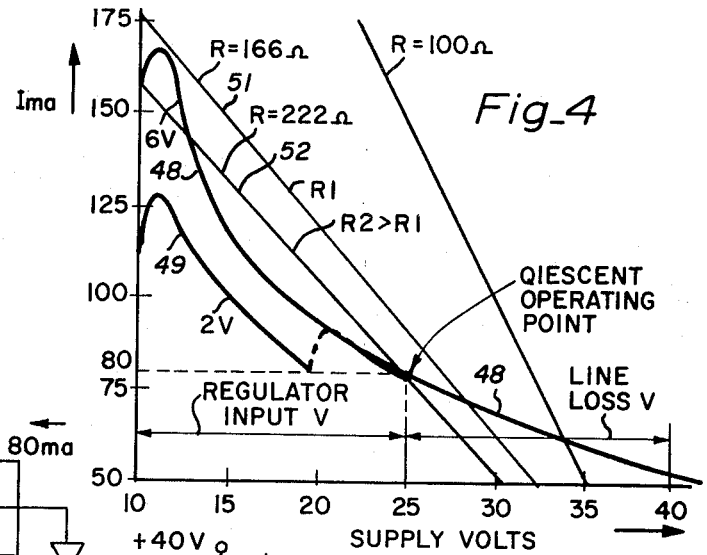
Fig_4
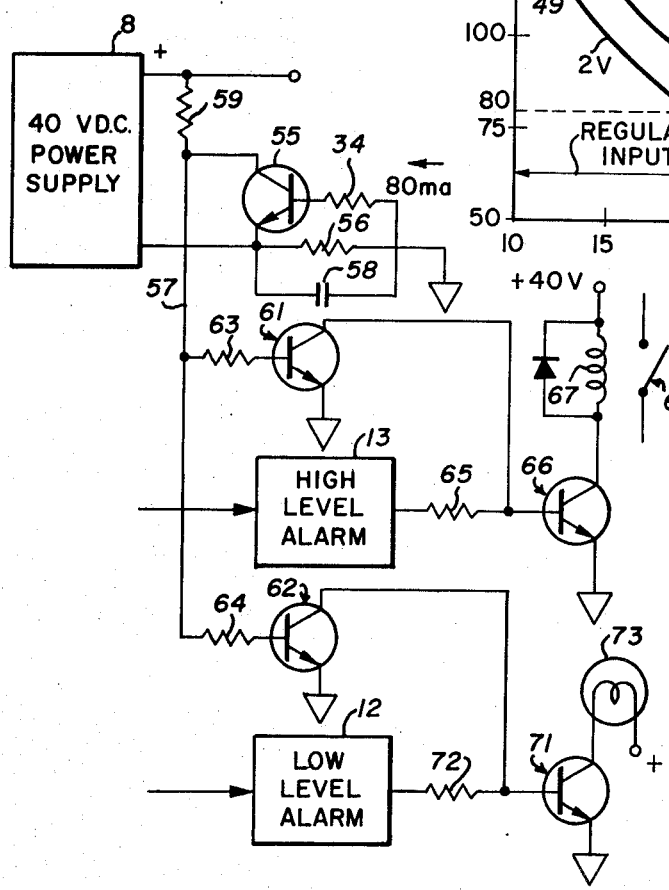
Fig_5
INVENTOR
DAVID M. HADDEN
BY Harry E. Aine
ATTORNEY

TWO CONDUCTOR TELEMETERING SYSTEM

DESCRIPTION OF THE PRIOR ART

Heretofore, telemetering systems have been proposed wherein the quantity to be measured is sensed at an outlying station to produce an output. The sensed output signal is fed to a voltage-to-frequency pulse generator (transmitter) for generating a train of pulses having a repetition rate dependent upon the quantity to be measured. The pulse train is then employed to modulate an RF carrier which is transmitted to a base station via the intermediary of a coaxial cable. A receiver at the base station converts the train of pulses into an output proportional to the pulse repetition rate which is a metered output of the quantity being measured at the outlying station. In this prior art system as disclosed in U.S. Pat. No. 3,231,877, issued Jan. 25, 1966, the power to supply the remote sensor is provided by a battery located at the remote location.

The problem with this type of a prior art telemetering system is that it is particularly disadvantageous for the measurement of combustible gases at the outlying stations since combustible gas detectors, such as catalytic combustible gas filaments, require relatively large amounts of power for heating the filament and, therefore, the battery requirements to be provided at the outlying station become prohibitive for prolonged operation as required in many cases. Moreover, a coaxial cable transmission line is relatively expensive for long distances and transmission of RF energy through a coaxial cable is a relatively lossy process.

Another prior art telemetering system, particularly suitable for monitoring combustible gas concentrations at outlying stations, employs four wires for operation. Two of the wires interconnect the base station with the outlying station for supplying power to the sensor at the remote location, whereas two additional wires are provided for the transmission of signals from the sensors to the receiver at the base station. In some instances, the distance from the base station to the outlying station can be on the order of 2 to 10 miles, therefore the cost of the wire required to provide a four-wire system becomes a relatively large factor in the overall cost of the system.

SUMMARY OF THE PRESENT INVENTION

The principal object of the present invention is the provision of an improved two conductor telemetering system.

One feature of the present invention is the provision, in a two conductor telemetering system, of means for transmitting power to a remote sensor and transmitter unit disposed at an outlying station over the same two conductors employed for transmission of signals from the outlying station to a receiver at the base station, whereby separate power sources are not required at the outlying station for energizing the transmitter and sensor.

Another feature of the present invention is the same as the preceding feature wherein the transmitter, at the outlying station, includes a pulse generator for generating a train of output pulses with a repetition rate which is a function of the output of the sensor.

Another feature of the present invention is the same as any one or more of the preceding features including the provision of a voltage regulator disposed at the outlying station for receiving the power passed thereto over the two conductors and for converting input power to the regulator at a relatively high unregulated voltage to an output power of a relatively low regulated voltage for energizing the sensor and transmitter, whereby the current passed over the transmission line between the base station and the outlying station can be relatively low compared to the current supplied from the regulator to the sensor thereby reducing power transmission losses.

Another feature of the present invention is the same as any one or more of the preceding features wherein the sensor at the outlying station comprises a filament heated by current passed thereto through and including the provision of a filament failure sensor at the base station for monitoring the current drawn from the power supply over the transmission line to sense a failure in the filament sensor and to give an indication of such filament failure.

Another feature of the present invention is the same as any one or more of the preceding features including the provision of a rectifier connected in series with one of the conductors of the transmission line at the outlying station, such rectifier being polarized for flow of current from the base station to the outlying station, and wherein the output pulses from the transmitter are applied to the conductor which includes the rectifier at a position on the base station side of the rectifier whereby devices on the remote side of the rectifier are decoupled from the transmitter during the duration of the pulse.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram, partly in block diagram form, depicting a two conductor telemetering system incorporating features of the present invention, FIG. 2 is a plot of pulse repetition rate per second versus percent of lower explosive limit for a combustible gas in air and depicting the pulse repetition rate parameter of the output of the transmitter employed in the system of FIG. 1, FIG. 3 is a schematic circuit diagram, partly in block diagram form, depicting the details of the switching voltage regulator circuit employed in the system of FIG. 1, FIG. 4 is a plot of input current in milliamps versus input voltage in volts to the input of the switching voltage regulator of FIG. 3 and depicting the start up and typical operating modes thereof for two output voltages, and FIG. 5 is a schematic circuit diagram, partly in block diagram form, of the filament failure sensor and alarm inhibit portions of the circuit of FIG. 1.

DESCRIPTION OF THE PREFERRED EMBODIMENTS

Referring now to FIG. 1, there is shown a telemetering system 1 incorporating features of the present invention. The telemetering system 1 includes a portion 2 disposed at an outlying station, such as at the end of a mine shaft, or at a remote pumping platform or the like in a refinery. The outlying station portion 2 of the telemetering system includes a switching voltage regulator 3 for receiving power and converting the received power to a well regulated lower voltage output power which is supplied across the terminals of a sensor 4 for sensing some quantity to be measured, such as the presence of a combustible gas, to produce an output voltage $e_o$ which is applied to a voltage to frequency pulse generator 5, which forms a transmitter, for transmitting the sensed quantity via a train of dc pulses over a two conductor transmission line 6, which may be up to 10 miles long, to a base station 7.

The base station 7 includes a source of dc power 8 for energizing the switching voltage regulator 3, sensor 4 and transmitter 5 via power supplied over the two conductor transmission line 6. The base station 7 also includes a receiver 9 which receives the train of dc pulses and converts the train of pulses to a metered output which drives a meter 11 and a pair of alarms, such as a low level alarm 12 and a high level alarm 113.

In a typical example, the power supply 8 supplies approximately 80 milliamps of power at 40 volts through an RF choke 14, as of 5 mh, and over the two conductor transmission line 6 to the input of the switching voltage regulator 3 via the intermediary of a rectifier 15. A smoothing capacitor 16 is connected across the output terminals of the power supply 8 and a storage capacitor 17, as of 10 microfarads at 40 volts, is connected across the input to the switching voltage regulator 3 for maintaining the voltage to the regulator in the presence of the output pulses supplied to the transmission line 6 on the base station side of the rectifier 15. The output of the switching voltage regulator 3 is a regulated output voltage of 2 to 6 volts, as more fully described below, which is applied to energize the sensor 4.

The sensor 4 includes a pair of catalytic combustible gas detecting filaments 18 and 19 connected in opposite arm of a bridge network and a pair of reference resistors 21 and 22 connected in the other arm of the bridge. One of the filaments 119 forms a reference and the other filament 18 is the active filament which experiences a change of resistance which is a function of the combustible gas content in the atmosphere.

When the sensor 4 is designed for sensing combustible gas concentrations such as the concentration of methane, propane, etc. in air, the catalytic combustible gas filaments 18 and 19 comprise catalytic platinum members. The active sensing filament 18 is exposed to the gas, whereas the reference filament 19 is of substantially the same construction but is inactive because its surface is pasivated. Upon exposure of the hot filaments 18 and 19 to the combustible gas mixture, the resistance of the active filament 18 increases with the combustible gas concentration. The increase of resistance of filament 18 causes an unbalance of the bridge resulting in an output voltage $e_o$ across terminals 23 and 24, such output $e_o$ being, for example, between 40 and 100 millovolts when the bridge is energized with 250 milliamps of current at 6 volts as supplied across terminals 25 and 26 of the bridge. Suitable catalytic combustible gas filaments 18 and 19 are commercially available from Beckman Instruments, Johnson & Williams, and from Mine Safety Appliance Co.

The transmission line 6 may comprise an unshielded pair of conductors such as a pair of 20 gauge doorbell wires, a twin-lead cable, one wire and a grounded pipe, rail, track, electrical conduit or trough, or merely one wire strung through an electrical conduit. The transmission line 6 may have any suitable length up to 10 miles long. In a preferred embodiment, the transmission line 6 can have any length so long as the total impedance of both conductors if connected end to end is equal to or less than 222 ohms.

One output of the switching voltage regulator 3 supplies input power to the voltage-to-frequency pulse generator 5 connected with its input across the output terminals 23 and 24 of the sensor 4. The output of the voltage-to-frequency pulse generator 5 comprises a train of negative 5 volt pulses having a pulse width of between 20 and 30 microseconds and a pulse repetition rate varying between 500 and 2,000 pulses per second. The pulse repetition rate is a function of the output voltage $e_o$ of the sensor 4. In a typical example, as depicted in FIG. 2, the pulse repetition rate varies nearly linearly form 500 pulses per second to 2,000 pulses per second over a combustible gas concentration range of interest taken in percent of the lower explosive limit. More particularly, the lower explosive limit is a certain concentration by volume of the combustible gas in air at which the gas becomes explosive. Thus, a suitable range of interest may be, for example, in the case of methane in mines 20 to 40 percent of the lower explosive limit.

The output pulses of the voltage-to-frequency pulse generator or transmitter 5 are applied to the positive conductor of the transmission line 6 via the intermediary of a coupling capacitor 27. The rectifier 15, such as a IN4148 diode rated for 200 ma at 75 v d.c., is disposed between the point of application of the output pulses of the pulse generator 5 and the storage capacitor 17 such that, when the positive conductor of the transmission line 6 is pulsed in the negative direction via the output of the pulse generator 5, the storage capacitor 18 does not discharge into the output of the voltage-to-frequency pulse generators. The polarity of the rectifiers 15 is opposed to such discharge, thereby holding the voltage applied to the input of the switching voltage regulator 3 relatively stable during the negative pulses applied from the pulse generator 5 to the transmission line 6. The negative conductor of the transmission line 6 is grounded. The decoupling function performed by rectifier 15 could also be performed by a radio frequency choke such as the 5 millihenry choke 14, but the provision of a choke 14 at this end of the transmission line 6 would serve to pick up a substantial amount of noise and is a relatively heavy, costly and bulky unit. Therefore, the rectifier 15 is much preferred to the use of a second choke.

The voltage-to-frequency pulse generator 5 serves as a transmitter and the output train of negative pulses applied to the transmission line 6 are transmitted over the transmission line 6 to the base station 7. At the base station 7 choke 14 prevents the pulses from passing into the power supply. The pulses are taken off the transmission line 6 via lead 28 and fed to the input of the receiver 9 via the intermediary of a dc blocking capacitor 29, as of 1 $\mu$f.

The receiver 9 includes an input pulse filter 30, such as a band pass RF filter, for filtering out undesired low and high frequency noise. The output of the pulse filter 30 is fed to the input of a one-shot multivibrator 31 which converts each of the negative pulses received from the pulse generator 5 into a longer, more uniform pulse as of 100µs duration and 7v amplitude with a pulse repetition rate equal to the pulse repetition rate of the pulse train received in the input of the one-shot multivibrator 31. The output of the one-shot multivibrator is fed to the input of an integrating amplifier 32 wherein it is integrated and amplified to produce a metered dc output voltage proportional to the pulse repetition rate and thus proportional to the quantity being measured by the remote sensor.

One output of the integrating amplifier 32 is fed to meter 11 to give an indication of the amplitude of the quantity being measured, such as combustible gas concentration. The other output of the integrating amplifier 32 is fed to one input of an inhibit gate 33 and thence to the input of the low and high level alarms 12 and 13, respectively. Each alarm 12 and 13 comprises, for example, a Schmitt trigger set to give an output when the input voltage thereto reaches a certain predetermined level corresponding to some predetermined level of the quantity being measured by the sensor 4. In a typical example, the low level of alarm could be set at 20 percent of the lower explosive limit and the high level alarm 13 could be set for 40 percent of the lower explosive limit. In a typical example, the output of the low level alarm is a horn or light which is extinguished by the operator pushing an acknowledge button. The output of the high level alarm typically automatically operates a horn or light and, in addition, shuts down the equipment at the outlying station such as at the end of the mine shaft or at a pumping platform or other location in the refinery.

A filament failure sensor 34, which we will more fully described below, senses the dc current drawn from the power supply 8 through the transmission line 6, and switching regulator 3 to the sensor 4. On a failure of one of the sensing filaments 18 or 19, the current drawn from the output of the switching voltage regulator 3 drops from approximately 250 milliamps to on the order of 20 milliamps at 6 volts. This causes a corresponding decrease in the power supplied to the switching regulator 3 from 80 milliamps at 40 volts to 15 milliamps at 40 volts. The filament failure sensor 34 senses when the current drawn from the power supply falls below a predetermined level, such as 20 milliamps at 40 volts, and sends an output to the second input of the inhibit gate 33 for inhibiting the output of the integrating amplifier 32 such that the alarms 12 and 13 are inhibited. The high and low level alarms need to be inhibited because failure of a filament 18 or 19 in the sensor 4 produces a substantial unbalance of the bridge producing an output votate $e_o$ which greatly increases the pulse repetition rates at the output of the voltage-to-frequency pulse generator 5. This increased pulse repetition rate corresponds to a high concentration of combustible gas and would, if not inhibited, activate both the high and low level alarm, in the normal case.

The advantages of the telemetering system 1 of FIG. 1 include the ability to use relatively inexpensive conductors for a relatively long transmission line 6. The same two wire transmission line 6 allows transmission of substantial amounts of high voltage low current power over long distances, efficiently because of low $i^2R$ losses, to a remote sensor requiring substantial current, at low voltage, at the outlying station while allowing transmission of transmitted pulse to the receiver at the base station. The provision of the switching voltage regulator 17 allows relatively high unregulated voltages at low current to be utilized for supplying the power from the base station to the outlying station over the two conductor transmission line 6 while permitting a well regulated low voltage at high current to be delivered to the sensor 4 without the requirement for batteries or other power sources at the outlying station 2. Use of negative dc pulses applied to the positive conductor of the transmission line provides an especially suitable means for transmitting the sensed information back over the two wires employed to supply power to the outlying station. The pulses are easily transmitted over relatively crude transmission lines and over relatively long distances without excessive attenuation as may be encountered with the prior art RF transmission schemes requiring coaxial cables. The negative pulses are readily detected in the receiver 9 without excessive interference with typical noise encountered in refineries, mines and the like.

Referring now to FIGS. 3 and 4, the circuitry of the switching regulator 3 is shown in greater detail. The switching regulator 3 preferably includes a conventional switching voltage regulator 35. Such a conventional voltage regulator 35 is disclosed in The Fairchild Semiconductor Integrated Circuit Data Catalog (1970) on pp. 6–93 and 6–88,89 FIG. 9. A programming circuit is provided at the input to the conventional switching voltage regulator 35 to provide a startup mode of operation wherein the output of the switching voltage regulator 15 is 2 volts when the input voltage to the switching voltage regulator 35 is below some predetermined level, such as 20 volts. The output shifts to a normal mode of operation with a regulated output voltage of 6 volts when the input voltage to the regulator 35 exceeds the predetermined lower level of 20 volts. More specifically, the programming circuitry for the regulator 35 includes a regulated reference voltage source 36 such as a Zenner diode connected across the input leads to the switching regulator 35 and providing a regulated output voltage of 6 volts at output terminal 37. The 6 volt output at 37 is applied as a reference input, to the switching voltage regulator 35, via resistor 38, as of 3.9K ohms, forming one resistor of a voltage divider network consisting of resistor 38 and resistor 39, as of 2K ohms, which is connected to ground via the collector to emitter electrodes of transistor 41. A storage capacitor 42, as of 0.1 microfarads, is connected across the reference voltage input to the switching regulator 35 for delaying the regulated reference input voltage to the switching regulator 35. The switching voltage regulator 35 of conventional design provides a regulated output voltage, at 43, which is regulated to the same voltage as the regulated reference voltage applied at reference input 44.

A start-up voltage control 45, such as a Schmitt trigger, has its input connected across the input terminals to the switching voltage regulator 35 and is supplied with a reference voltage from the output 37 of the regulated reference voltage supply 36. The start-up voltage control 45 is set such that it will produce an output to the base of transistor 41 to bias transistor 41 to a non-conductive state when the input voltage to the start-up control 45 reaches some predetermined level, as of 20 volts. Thus, transistor 41 is normally biased to the conducting state for start-up such that the regulated reference output voltage of 6 volts at 37 is divided via the voltage divider consisting of resistors 38 and 39 to a regulated input voltage of 2 volts to the switching voltage regulator at input 44 such that the output of the switching voltage regulator 35 is a regulated 2 volts for start-up conditions.

When the input voltage applied across the input terminals to the switching voltage regulator 35 exceeds the predetermined start-up voltage control level, as of 20 volts, the start-up voltage control 45 turns transistor 41 off, thereby eliminating the voltage divider action of resistors 38 and 39 such that the full regulated 6 volt reference at 37 is applied to the input 44 of the switching voltage regulator, thereby causing the output of the switching voltage regulator 35 to be a regulated 6 volts.

The advantage of programming the switching voltage regulator 35 to provide a low start-up voltage output and a higher ordinary operating regulated voltage can be seen by reference to FIG. 4. FIG. 4 is a plot of the unregulated input current, in milliamps, and supply voltage, in volts, as applied to the input and of the transmission line as connected to the switching voltage regulator 35 for two values of regulated output volts at 43. The input power for a regulated output volts of 6 volts is indicated by curve 48, whereas the input power characteristics for a regulated 2 volts output is shown by curve 49. As the input voltage increases above some relatively low threshold value the input current increases steeply and, for a 6 volt regulated output, the input current reaches a maximum of about 165 milliamps at 12 volts input voltage. After reaching a maximum input current, the input current decreases in accordance with a constant input power curve to the maximum input voltage of 40 volts, at which point the input current is 80 milliamps.

Resistance lines 51 and 52 correspond to the values of resistance of the input leads including the resistance of the transmission line 6 from the power supply 8 to the switching regulator 3. Curve 51 corresponds to a lower resistance than curve 52. Thus, it is seen from the plot of FIG. 4 that if the input transmission line 6 to the switching voltage regulator 3 had resistance values corresponding to line 52 that the switching regulator could not start for a 6 volt output, as shown by line 48, because the voltage drop through the lines, for the input current would prohibit the 12 volt input voltage from being obtained across the input to the regulator 3. Thus, the switching voltage regulator 3 would not start. If a 6 volts regulated output were continuously required, the resistance of the transmission line 6 would have to be relatively small such as 166 such that the line 51 for the resistance of transmission line 6 would not intersect with the 6 volt regulated input power curve 48 to assure starting. However, a long, low resistance transmission line 6 is relatively expensive. Thus it is desired to employ as high a total impedance $Z_t$ for the transmission line 6 as is possible.

Accordingly, the programmed start-up voltage control 45, which starts the switching voltage regulator 35 on the 2 volt regulated output curve, as shown by 49, permits relatively high input resistance for the transmission line 13 and permits operation over and onto the constant power side of the input curve 49. Once on the constant power side and when the supply voltage has reached some suitable level as of 40 volts and 20 volts across the input to the switching regulator 3, the start-up control switches the switching regulator to a 6 volt regulated output, i.e., switches up to output curve 48 which is now on the constant power side of the 6 volt curve 48, thereby permitting operation with relatively high impedance for the transmission line 6 on the constant power side of the 6 volt curve 48.

Capacitor 42 serves to delay the reference voltage to the input of the switching voltage regulator 35 such that the regulated output current and voltage is maintained at a relatively low value for about 200 milliseconds on starting in order to enable the filaments 18 and 19 to reach operating temperature and resistance such that a relatively high current does not flow through these elements when they are cold. Capacitor 42 serves as a simple programmed start-up control when the start-up, operating potential builds up rapidly across the input the voltage regulator 35, i.e., with a time constant comparable to the time constant of the voltage build-up across capacitor 42. However, in many cases the potential will fall and build-up slowly, i.e., over several seconds at the input to the regulator 35. In such a case this time constant exceeds that of the capacitor 42 and the separate programmed start-up control 45 is required for starting.

Referring now to FIG. 5, there is shown the filament failure sensor 34 and the inhibit circuit 33. More particularly, a sensor transistor 55, such as an NPN 2N5136 has its emitter and base electrodes connected across a sensing resistor 56 connected in series with the negative lead of the power supply 8 for sensing the current supplied to the switching voltage regulator 3 and to the sensor 4 via the transmission line 6. The normal current flow, as of 80 milliamps at 40 volts, through sensing resistor 56 normally biases transistor 55 for a conducting state such that the normal output voltage on line 57 connected to the collector electrode is ground or zero volts. A by-pass capacitor 58 is connected across the sensing resistor 56 for by-passing high frequency noise and the signal pulses. When transistor 55 is conducting, load resistor 59 drops the output voltage of the power supply 8 thereacross.

When the current drawn by the switching voltage regulator 3 from the power supply 8 drops below some predetermined level, as of 15 milliamps at 40 volts, which is indicative of a failure of the filaments 18 or 19, the voltage across sensing resistor 56 is insufficient to retain transistor 55 in the normally conductive state and transistor 55 switches to a non-conductive state, thereby applying the positive output voltage of the power supply 8 to the base electrodes of transistors 61 and 62 via the intermediary of isolating base resistors 63 and 64, respectively. Transistors 61 and 62 are normally in a non-conductive state and when the positive output is supplied to their bases via lead 57 they are switched to the conducting state, thereby causing the outputs of the high level alarm 13 and the low level alarm 12 to be grounded via inhibit transistors 61 and 62, respectively. The output of the high level alarm 13 is fed through an isolating resistor 65 to the base of a switched transistor 66. Transistor 66 is connected in series between a source of power at 40 volts and the actuating coil 67 of a relay 68 for controlling the current flow in a circuit 69 which may be employed for shutting down power equipment at the outlying station. A diode is connected across the coil of the relay 68 in the reverse direction to damp transient current flow.

The high level alarm 13 which may comprise, for example, a Schmitt trigger, is set such that when the input to the high level alarm 13 reaches a predetermined level, such as the dc voltage corresponding to a pulse repetition rate corresponding to 40 percent of the lower explosive limit, the output of the Schmitt trigger produces an output which turns on transistor 66 and closes the relay 68 to shut down equipment at the outlying station.

However, when a filament failure is sensed inhibit transistor 61 grounds the base of switching transistor 66 to prevent the output of the high level alarm 13 from switching transistor 66 to the conductive state. Likewise, the output of the low level alarm 12 is fed to the base of a second switching transistor 71 via isolating resistor 72. Transistor 71 is connected in circuit with a suitable alarm, such as a horn, bell, light or the like, schematically indicated at 73. The low level alarm 12 may comprise, for example, a Schmitt trigger set to produce an output when a certain input voltage level has been supplied, such input level corresponding, for example, to a pulse repetition rate corresponding to 20 percent of the lower explosive limit. The output of the low level alarm 12 switches transistor 71 to the conductive state and actuates the alarm device 73. However, when filament failure is sensed by transistor 55, the base of switching transistor 71 is grounded via inhibit transistor 62 such that the output of the low level alarm 12 is prevented from actuating transistor 71.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a telemetering apparatus, sensor means for disposition at an outlying station and for sensing a parameter to be measured and for producing a sensor output which is a function of the parameter being measured, pulse generator means for location proximate the outlying station and for converting the sensor output into an output train of pulses which have a parameter which is a function of the sensor output signal, a pair of conductors for interconnecting the outlying station with a base station and for providing a transmission line for flow of power from the base station to said sensor and pulse generator means and for flowing the output train of pulses of said pulse generator means from the outlying station in a direction counter to the direction of power flow to the outlying station, receiver means for connection to said transmission line proximate the base station for receiving the output train of pulses and for producing an output which is a function of the parameter being sensed, voltage regulator means to be located at the outlying station and to be connected to said pair of conductors to receive power flowing from a power supply at the base station over said transmission line formed by said pair of conductors for producing output power to be supplied for energizing said sensor, such output power being of a substantially reduced and regulated voltage relative to the input voltage to said regulator means, and control means having first and second stable reference control outputs for controlling said voltage regulator means such that the regulated output voltage of said regulator means is maintained at a first output level corresponding to said first control output when the input voltage to said regulator means is below a first input level and maintained at a second output level corresponding to said second control output and higher than the first output level when the input voltage to said regulator means is above the first input level.

2. In a telemetering apparatus, sensor means for disposition at an outlying station and for sensing a parameter to be measured and for producing a sensor output which is a function of the parameter being measured, pulse generator means for location proximate the outlying station and for converting the sensor output into an output train of pulses which have a parameter which is a function of the sensor output signal, a pair of conductors for interconnecting the outlying station with a base station and for providing a transmission line for flow of power from the base station to said sensor and pulse generator means and for flowing the output train of pulses of said pulse generator means from the outlying station to the base station in a direction counter to the direction of power flow to the outlying station, receiver means for connection to said transmission line proximate the base station for receiving the output train of pulses and for producing an output which is a function of the parameter being sensed, voltage regulator means to be located at the outlying station and to be connected to said pair of conductors to receive power flowing from a power supply at the base station over said transmission line formed by said pair of conductors for producing output power being of a substantially reduced and regulated voltage relative to the input voltage to said regulator means, said voltage regulator means being a switching regulator, whereby power of a regulated voltage is supplied efficiently to said sensor means; and wherein said sensor means includes, catalytic combustible gas detection filament means to be directly heated by current passed through said filament means from the output of said regulator means.

3. The apparatus of claim 2 wherein said filament means includes a pair of catalytic combustible gas detection filaments, electrical bridge means having each of said filaments in different respective arms of said bridge and connected to said voltage regulator means to be energized by the output of said regulator means, and wherein the output of said bridge constitutes the output signal of said sensor.

4. In a telemetering apparatus, sensor means for disposition at an outlying station and for sensing a parameter to be measured and for producing a sensor output which is a function of the parameter being measured, pulse generator means for location proximate the outlying station and for converting the sensor output into an output train of pulses which have a parameter which is a function of the sensor output signal, a pair of conductors for interconnecting the outlying station with a base station and for providing a transmission line for flow of power from the base station to said sensor and pulse generator means and for flowing the output train of pulses of said pulse generator means from the outlying station to the base station in a direction counter to the direction of power flow to the outlying station, receiver means for connection to said transmission line proximate the base station for receiving the output train of pulses and for producing an output which is a function of the parameter being sensed, and failure sensor means connected to at least one of said pair of conductors proximate the base station end thereof for sensing a reduction in the current flow over said pair of conductors from the power source to the outlying station and for producing an output indicative of such current flow reduction, such reduction in current flow being indicative of the failure of a power consuming device at the outlying station.

5. The apparatus of claim 4 including, alarm means connected to receive the output of said receiver means and for producing an alarm output when the output of said receiver means is indicative of a predetermined combustible level sensed by said sensor means, and inhibit means connected to receive the output of said failure sensor and being responsive to a failure output of said failure sensor for inhibiting the alarm output of said alarm means in response to a failure output signal.

6. In a telemetering apparatus, sensor means for disposition at an outlying station and for sensing a parameter to be measured and for producing a sensor output which is a function of the parameter being measured, pulse generator means for location proximate the outlying station and for converting the sensor output into an output train of pulses which have a parameter which is a function of the sensor output signal, a pair of conductors for interconnecting the outlying station with a base station and for providing a transmission line for flow of power from the base station to said sensor and pulse generator means and for flowing the output train of pulses of said pulse generator means from the outlying station to the base station in a direction counter to the direction of power flow to the outlying station, receiver means for connection to said transmission line proximate the base station for receiving the output train of pulses and for producing an output which is a function of the parameter being sensed, voltage regulator means to be located at the outlying station and to be connected to said pair of conductors to receive power flowing from a power supply at the base station over said transmission line formed by said pair of conductors for producing output power to be supplied for energizing said sensor, such output power being of a substantially reduced and regulated voltage relative to the input voltage to said regulator means, storage capacitor means connected across the input of said voltage regulator means at the outlying station for stabilizing the input voltage to said voltage regulator means against relatively short term fluctuations, rectifier means series connected in one of said conductors of said pair of conductors proximate said storage capacitor means and between the source of power and said storage capacitor means, the output of said pulse generator means being connected to one of said conductors of said pair of conductors proximate the outlying station and to one of said conductors intermediate the source of power and said rectifier means, and said rectifier means being connected with a polarity for current conduction therethrough from the power supply to said storage capacitor while preventing current discharge of said storage capacitor means through said rectifier means to the output of said pulse generator means.

* * * * *